United States Patent [19]
Radev

[11] Patent Number: 6,005,358
[45] Date of Patent: Dec. 21, 1999

[54] DRIVE SYSTEM FOR ELECTRIC VEHICLES

[76] Inventor: Vladimir Radev, 142 Marina Bay Ct., Highlands, N.J. 07732

[21] Appl. No.: 09/104,799

[22] Filed: Jun. 25, 1998

Related U.S. Application Data

[63] Continuation of application No. 08/795,668, Feb. 6, 1997, Pat. No. 5,804,935.

[51] Int. Cl.$^6$ .............................. H02K 23/60; B60L 11/18
[52] U.S. Cl. .......................... 318/139; 318/539; 310/115; 180/65.7; 180/65.8
[58] Field of Search ..................................... 318/139, 538, 318/539; 180/65.1, 65.6, 65.7, 65.8; 310/114, 115, 118, 119, 120, 121

[56] References Cited

U.S. PATENT DOCUMENTS

| | | |
|---|---|---|
| 424,818 | 4/1890 | Perret . |
| 2,391,103 | 12/1945 | Piron . |
| 3,789,281 | 1/1974 | Shibata . |
| 3,894,605 | 7/1975 | Salvadorini . |
| 4,130,172 | 12/1978 | Moody . |
| 4,405,028 | 9/1983 | Price . |
| 5,562,566 | 10/1996 | Yang . |

Primary Examiner—Bentsu Ro

[57] ABSTRACT

A dual-rotor electric motor (1), having an outer rotor (3) and an inner rotor (4), drives a first drive axle (5) and a second drive axle (6), while also provides inter-axle speed differential function. One of the drive axles is also a steering axle. Torque and rotation are transmitted between the outer rotor and the first drive axle through a clutch (19) and a first drive shaft (20), and between the inner rotor and the second drive axle through a second drive shaft (22). A first brake (24) brakes the rotation of the outer rotor, and a second brake (25) brakes the rotation of the inner rotor. A fluid pressure source, including a pump (51) and an accumulator (59), provides fluid pressure, through a plurality of fluid lines, for operating the clutch and brakes. Electromagnetic control valves (60, 61, 62) control the operation of the clutch and brakes. An electronics (78) monitors and compares continuously the rotational speeds of the axles and controls the valves for engaging the clutch and releasing the first brake when a speed lower than a predetermined value is detected, whereby providing low-speed/four-wheel-drive mode, or disengaging the clutch and applying the first brake when a speed higher than a predetermined value is detected, whereby providing high-speed/two-wheel-drive mode, or applying the first brake or the second brake when a traction slip respectively of the first drive axle or of the second drive axle higher than a respective predetermined value is detected, whereby providing anti-slip traction control.

24 Claims, 1 Drawing Sheet

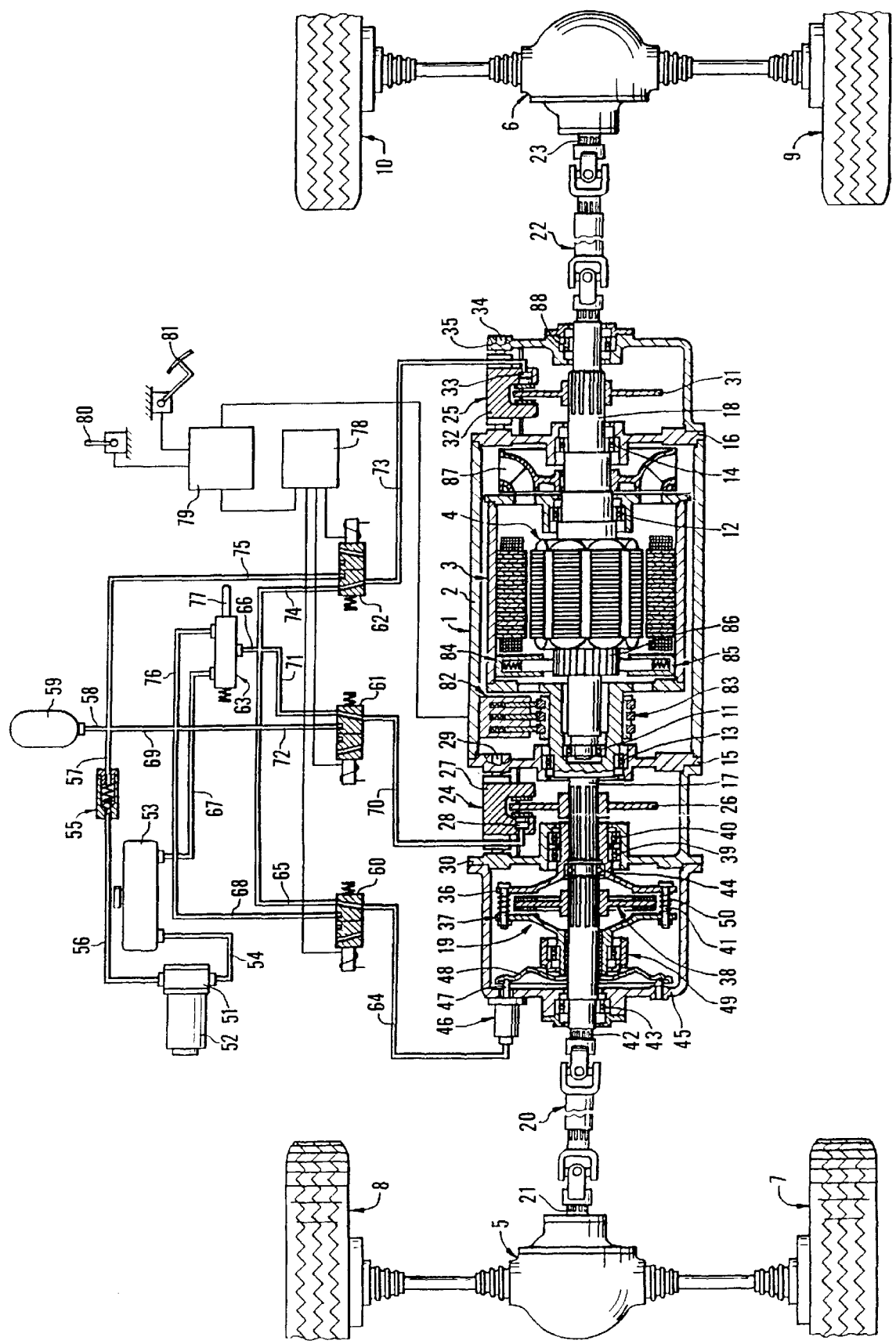

DRIVE SYSTEM FOR ELECTRIC VEHICLES

This application is a continuation of application Ser. No. 08/795,668, filed Feb. 6, 1997, now U.S. Pat. No. 5,804,935.

BACKGROUND OF THE INVENTION

This invention relates generally to drive systems for electric vehicles, and more particularly to four-wheel-drive systems for electric automobiles.

The four-wheeled electric vehicles, and more particularly the electric battery-powered automobiles, normally have a conventional electric traction motor, driving two of the vehicle wheels through the final drive and differential of a drive axle. In this invention, the term "conventional traction motor" is used to indicate a traction motor of any appropriate electrical type, having a stator and a rotor. In some drive systems the conventional traction motor is integrated with the final drive and differential into a motor-transaxle. Some drive axles have a limited-slip differential for limiting the traction slip of one of the drive wheels, in case of poor traction conditions, and providing some torque to the drive wheel with better traction. The described two-wheel-drive systems are simple and efficient. However, generally, the two-wheel-drive is inferior to the four-wheel-drive, as far as the traction and handling of the vehicle are concerned.

Different four-wheel-drive systems for automotive type vehicles are known in the art. Some of these systems generate tractive force permanently throughout all four vehicle wheels, while others have provisions for selection of a four-wheel-drive mode or a two-wheel-drive mode. However, the four-wheel-drive automobiles have two drive axles, one of which is also a steering axle. In a four-wheel-drive system for electric vehicles, having a conventional traction motor, torque and rotation from the motor rotor are split between the front and rear drive axles through a transfer box and an inter-axle differential. Usually a limited-slip inter-axle differential is used for limiting the traction slip of the wheels of one of the axles, in case of poor traction conditions, and providing some torque to the wheels of the axle with better traction. However, the addition of a transfer box and a limited-slip inter-axle differential complicates significantly a four-wheel-drive system. High cost and low mechanical efficiency are the major disadvantages of the known four-wheel-drive systems, in comparison with the two-wheel-drive ones. An improvement of the average mechanical efficiency of a four-wheel-drive is achieved when the system provides for selection of four-wheel-drive mode or two-wheel-drive mode. Then, the four-wheel-drive is used normally at lower speed and bad road conditions when more traction is needed, and the two-wheel-drive is used normally at higher speed and good road conditions when the traction of two drive wheels is sufficient. However, the addition of a mechanism for selectively connecting or disconnecting one of the axles to or from the power train further complicates the four-wheel-drive systems.

It is well known in the art that the capacity for energy storage of the present-days electric batteries is quite limited, while their weight is significant. Therefore, the efficiency of the drive train of the electric battery-powered vehicles is of an utmost importance. Along with the high cost, the low efficiency is the major reason why the four-wheel-drive system of the above described types have not found practical application in the contemporary electric automobiles.

Some four-wheel-drive electric vehicles have two conventional traction motors, each one driving one of the two drive axles of the vehicle. This type four-wheel-drive systems do not require a transfer box and a limited-slip inter-axle differential. Each of the two mechanically independent drive trains of the system is simple and efficient. Nevertheless, such a system requires a quite complicated double-motor controller, capable to coordinate continuously the rotational behavior of both motors. Overall, the incorporation of two traction motors and a complex double-motor controller makes such four-wheel-drive systems quite expensive. That is why they have found limited practical application, mainly in the design of heavy electric battery-powered vehicle.

All of the above described two-wheel-drive and four-wheel-drive systems normally have rigid mechanical power trains providing a single rotational speed reduction ratio between the rotor of the traction motor and the vehicle drive wheels. Therefore, the rotational speed of the vehicle wheels, and consequently—the speed of the vehicle, is substantially directly proportional to the rotational speed of the motor rotor. The vehicle speed and tractive effort are controlled, by the operator of the vehicle, through the traction motor electrical controller, which provides variable torque and rotational speed of the motor rotor in relation with the position of the vehicle accelerator pedal and the external forces resisting or helping the motion of the vehicle. The vehicle direction of motion is controlled also through the traction motor electrical controller, which changes the direction of rotation of motor rotor in relation with the position of a forward/reverse switch, controlled by the operator of the vehicle. Usually the traction motor is also used for electric braking of the vehicle, and particularly for speed retardation on a long downhill incline, by generating torque resisting the motion of the vehicle. The braking action of the traction motor is controlled directly by the operator of the vehicle through suitable means. Usually, the traction motor controller is also arranged to protect automatically the rotor from over-speeding, if, for some reason, the power train is interrupted and the energized motor remains under no torque resisting the rotation. However, the described above electric drive control is well known and relatively simple and efficient. Nevertheless, the existing electric vehicles, having a rigid drive train, provide substantially lower maximum speed than the maximum speed of the compatible automobiles powered by internal combustion engines. That is because the current-torque-speed characteristics of the conventional traction motors of different electrical types usually cannot meet both tractive effort and speed requirements of the contemporary automobiles. A gear-shift transmission may be incorporated into the drive train for providing several speed ratios, and thus to increase the vehicle speed range. Nevertheless, such a solution is not practically applicable because of a substantial additional cost and mechanical losses, which a gear-shift transmission would contribute to the drive system of an electric vehicle.

Drive systems for electric vehicles utilizing a traction motor having two rotors and no stator, although very seldom used, are also known in the art.

The electric motors having an outer rotor and an inner rotor are known under different names, such as stator-less motors, or dual-rotor motors, or double-rotor motors, etc. However, hereinafter the term "dual-rotor motor" is accepted and used in this invention to designate such a motor. In the dual-rotor motors, usually the outer rotor is arranged as a motor field and the inner rotor is arranged as a motor armature. The inner rotor is mounted coaxially inside the outer rotor. Both rotors are mounted in the motor housing, and, when the motor is energized, rotate in opposite directions under the action of the same electromagnetic forces. Normally, the electric current is conducted from terminals on the stationary motor housing to the rotating outer rotor through the contact of brushes, attached to the motor housing, and rings, mounted on the outer rotor. Otherwise, the arrangement, and particularly the wiring and electrical control of a dual-rotor motor, is generally the same as those of a conventional motor of the same electrical type. A dual-rotor traction motor may be a direct-current motor or an alternating-current motor of any particular type and design appropriate for a traction motor of a vehicle. In the known drive systems, usually the dual-rotor motor is integrated with two planetary reducers in a motor-transaxle. Torque and rotation are transmitted between the shaft of the outer rotor and the shaft of one of the drive wheels through one of the planetary reducers, and between the shaft of the inner rotor and the shaft of the other drive wheel—through the other planetary reducer. The two planetary reducers have the same reduction ratio. The output shaft of one of the reducers rotates in the same direction as the direction of rotation of the respective rotor, while the output shaft of the other reducer rotates in direction opposite to the direction of rotation of its respective rotor. Therefore, the output shafts of both reducers, and thus the two drive wheels, rotate in the same direction. A remarkable feature of a dual-rotor motor is that both rotors, driven by the same electromagnetic forces to rotate in opposite directions, produce equal torques on their output shafts but may rotate with different absolute rotational speeds, referring to a static body—such as the motor housing. Thus, the dual-rotor traction motor in the described above motor-transaxles provides for a speed differential between the two wheels of the axle. One of the major disadvantages of the existing drive systems with dual-rotor motors is that they have generally the same quite limited speed range as the described before systems with conventional traction motor and rigid drive train. For that reason, two-wheel drive systems having a dual-rotor traction motor have been used mainly in slow-moving vehicles, such as industrial trucks. However, although a dual-rotor traction motor is more complicated than an equivalent conventional traction motor, the described above drive systems utilizing a dual-rotor motor are overall relatively simple and efficient.

When a dual-rotor motor is incorporated in a drive system, the total available torque on the shafts of both rotors is two times bigger than the torque available on the shaft of an otherwise equivalent conventional motor. Another important feature of the dual-rotor motors is that, if both rotors are made of materials with the same or similar strength, the smaller inner rotor can rotate safely with much higher absolute rotational speed than the safe absolute rotational speed of the larger outer rotor, because the destructive centrifugal forces are substantially proportional to the mass and the square of the radius of each rotor. On the other hand, the control of a dual-rotor motor, including the current-torque-speed control, electric braking and speed retardation of the vehicle, over-speed protection of the rotors, and thermal protection of the motor, is arranged generally in the same manner and by the same means as in a conventional traction motor of the same electrical type. In this regard, a dual-rotor traction motor is not more complicated than an equivalent conventional motor of the same electrical type. However, the unique features and advantages of the dual-rotor traction motors described above have not yet been fully explored and utilized in the design of electric automobiles. Therefore, it will be beneficial if a simple and efficient four-wheel-drive system for electric battery-powered vehicle can be provided by using a dual-rotor traction motor with a conventional single motor controller, instead of using two conventional traction motors with a complicated dual-motor controller or a single conventional traction motor but with the addition of some complicated and inefficient drive train, such as those described herein earlier.

Friction clutches of different types are used for transmitting and selectively interrupting the transmission of torque and rotation between the components of a vehicle drive train. Usually, means using fluid pressure or electrical means operate the automotive clutches. When engaged, the frictional clutch is an extremely efficient power-transmitting element. Also, hydraulic and electric brakes of different types are well known and used for selectively braking the rotation of the vehicle wheels or other rotating components of the vehicle drive train. The contemporary clutches and brakes are relatively simple and inexpensive automotive components. Therefore, it will be beneficial if a four-wheel drive system for electric vehicles can be arranged to provide a wide speed range and selection of four-wheel-drive mode or two-wheel-drive mode, utilizing only a clutch and a brake, instead of a long drive train including a gear-shift transmission, a transfer box, a limited slip inter-axle differential and a mechanism for selectively disconnecting or connecting one of the drive axles from or to the power train, which all are complicated, noisy, energy-consuming and expensive components.

Vehicle electronics, well known in the art, are capable to monitor continuously, through appropriate sensors, the rotational speed of the vehicle wheels or the rotational speed of the input shafts of the drive axles, as well as the rotational speed of other drive train components or other variable parameters, related to the rotational speed of the vehicle wheels, such as the steering angle of the vehicle steering wheels. Such an electronics processes the signals from several sensors, and, in accordance with a predetermined program, controls the operation of means whose quick reaction is of utmost importance for the performance and safety of the vehicle. For example, the electronics may control the performance of the engine of the vehicle, or an automatic gear-shift transmission, or an anti-lock braking system, or an anti-slip traction control system, or another system or combination of systems. Therefore, it will be beneficial if such an electronics may be incorporated in the design of an electric vehicle for providing automatic control of the drive system, in accordance with the rotational behavior of the drive axles and a predetermined program, and thus securing better performance and safety of the vehicle.

SUMMARY OF THE INVENTION

Accordingly, an object of this invention is to provide a simple and efficient four-wheel-drive system for electric vehicles, therefore said drive system comprising a dual-rotor traction motor having an outer rotor and an inner rotor, a first drive axle and a second drive axle, one of which two drive axles being also a steering axle, means for transmitting torque and rotation between said outer rotor and the first of said two drive axles, and means for transmitting torque and rotation between said inner rotor and the second of said two drive axles.

Another object of this invention is to provide the drive system with capability to operate in a low-speed/four-wheel-drive mode and in a high-speed/two-wheel-drive mode, therefore said means for transmitting torque and rotation between said outer rotor and said first drive axle are a frictional clutch for interrupting the transmission of torque and rotation between the outer rotor and the first drive axle, and means for transmitting torque and rotation between said clutch and the first drive axle, and said drive system also comprising a first brake for braking the rotation of the outer rotor, and means for drive mode control selectively engaging said clutch and releasing said first brake or disengaging the clutch and applying the first brake.

Still another object of this invention is to provide the drive system with capability to change automatically from low-speed/four-wheel-drive mode to high-speed/two-wheel-drive mode and vice versa, therefore said means for drive mode control are electrically controllable means operating the clutch, electrically controllable means operating the first brake, and an electronics arranged and programmed to monitor continuously the rotational speed of at least one of said two drive axles and to control said means operating the clutch and said means operating the first brake for engaging the clutch and releasing the first brake when a rotational speed lower than a predetermined value is detected or disengaging the clutch and applying the first brake when a rotational speed higher than a predetermined value is detected.

Yet another object of this invention is to provide the drive system with capability to automatically restrict the traction slip of the vehicle wheels, therefore said drive system also comprising a second brake for braking the rotation of said inner rotor, means operating said second brake, and an electronics arranged and programmed to monitor and compare continuously the rotational speeds of said first and second drive axles and to control said means operating the first brake and said means operating the second brake for applying the first brake when a traction slip of the first drive axle higher than a predetermined value is detected or applying the second brake when a traction slip of the second drive axle higher than a predetermined value is detected.

And yet another object of this invention is to utilize the braking capacity of said clutch and said first and second brakes, incorporated in the drive system, for providing the vehicle with a secondary braking system, when such a secondary braking system is required by the law or desirable for the safety of the vehicle, therefore said drive system also comprising means controllable by the operator of the vehicle for simultaneously applying said first and second brakes when said clutch is engaged and the first brake is released by said means for drive mode control or simultaneously engaging the clutch and applying the second brake when the clutch is disengaged and the first brake is applied by the means for drive mode control.

And still another object of this invention is to provide the drive system with capability to protect the rotors of said dual-rotor motor from over-speeding, therefore said drive system also comprising an electronics arranged and programmed to monitor continuously the rotational speeds of said outer rotor and said inner rotor for disenergizing the dual-rotor motor when a rotational speed of either rotor higher than a respective predetermined maximum value is detected.

These and other objects and advantages of this invention will become apparent from the following description and the accompanying drawing.

BRIEF DESCRIPTION OF THE DRAWING

The single FIGURE in the drawing is a schematic illustration of an embodiment of a drive system according to this invention.

DETAILED DESCRIPTION

Referring to the drawing, a dual-rotor electric traction motor 1, having a motor housing 2, an outer rotor 3 and an inner rotor 4, is attached to the vehicle chassis, between two drive axles 5, 6 of the vehicle. One of the drive axles 5, 6 is also the vehicle steering axle. Both drive axles 5, 6 with the respective vehicle wheels 7, 8, 9, 10 are suspended to the chassis of the vehicle in a suitable manner known in the art. However, for simplicity of drawing and description, the vehicle chassis, suspension of axles and wheels, and arrangement of steering are not shown. The inner rotor 4 is supported coaxially inside the outer rotor 3 by bearings 11, 12. Both rotors 3, 4 are supported rotatably by bearings 13, 14 mounted in side flanges 15, 16 of the dual-rotor motor housing 2. The axis of rotation of the rotors 3, 4 is substantially parallel to the longitudinal axis of the vehicle. A shaft 17 of the outer rotor 3 extends through the first side flange 15 of the motor housing 2 in direction toward the first drive axle 5, and a shaft 18 of the inner rotor 4 extends through the second side flange 16 of the motor housing 2 in direction toward the second drive axle 6.

Means for transmitting torque and rotation between the outer rotor 3 and the first drive axle 5 are provided. In this embodiment of the invention, a frictional clutch 19 and a first drive shaft 20 transmit torque and rotation between the shaft 17 of the outer rotor 3 and an input shaft 21 of the first drive axle 5. Means for transmitting torque and rotation between the inner rotor 4 and the second drive axle 6 are provided. In this embodiment of the invention, a second drive shaft 22 connects the shaft 18 of the inner rotor 4 with an input shaft 23 of the second drive axle 6. The clutch 19 is included in the drive train for selectively interrupting the transmission of power between the outer rotor 3 and the first drive axle 5.

A first brake 24 is provided for braking the rotation of the outer rotor 3, and a second brake 25 is provided for braking the rotation of the inner rotor 4. The clutch 19, first brake 24 and second brake 25 can be of any appropriate types known in the art. However, in this embodiment of the invention, clutch and brakes operated by fluid pressure are shown and described in more details hereinafter.

The first brake 24 is a fluid-pressure operated caliper disc brake having a disc 26 mounted onto the shaft 17 of the outer rotor 3, and a caliper 27 having at least one brake cylinder 28. Said caliper 27 is mounted on two pins 29 between the first side flange 15 of the motor housing 2 and a first brake enclosure 30. Only one of said pins 29 is shown. The first brake enclosure 30 is attached to the first side flange 15 of the motor housing 2. The second brake 25 is a fluid-pressure operated caliper disc brake having a disc 31 mounted onto the shaft 18 of the inner rotor 4, and a caliper 32 having at least one brake cylinder 33. Said caliper 32 is mounted on two pins 34 between the second side flange 16 of the motor housing 2 and a second brake enclosure 35. Only one of said pins 34 is shown. The second brake enclosure 35 is attached to the second side flange 16 of the motor housing 2. The clutch 19 is a fluid-pressure operated friction clutch having a driving plate 36, a pressure plate 37, and a driven friction plate 38. The driving plate 36 is mounted onto the shaft 17 of the outer rotor 3 and is supported rotatably by bearings 39, 40 in the first brake enclosure 30. The pressure plate 37 is mounted coaxially and connected to rotate together with the driving plate 36 through several pins 41 attached to the driving plate 36 in parallel to the axis of rotation. The fits between the pressure plate 37 and each of the pins 41 allow for axial movement of the pressure plate 37. The driven friction plate 38 is mounted coaxially between the driving plate 36 and the pressure plate 37, onto a clutch output shaft 42. The fit between the driven frictional plate 38 and clutch output shaft 42 allows for axial movement of the driven frictional plate 38. The clutch output shaft 42 is supported rotatably by bearings 43, 44 in a clutch enclosure 45 and in the driving plate 36. The clutch enclosure 45 is attached to the first brake enclosure 30. The pressure plate 37 is mounted rotatably onto the clutch output shaft 42. The fit between the pressure plate 37 and clutch output shaft 42 allows for axial movement of the pressure plate 37. The first drive-shaft assembly 20 connects the clutch output shaft 42 with the input shaft 21 of the first drive axle 5. The engagement of the clutch 19 is achieved under the action of a clutch cylinder 46, attached to the clutch enclosure 45. When the clutch cylinder 46 is actuated by fluid pressure, a cylinder push-rod 47 applies a force upon the pressure plate 37 through a lever 48, attached to the clutch enclosure 45, and a bearing assembly 49, mounted coaxially and rotatably onto the pressure plate 37 of the clutch 19. Consequently, the driven frictional plate 38 is pressed between the pressure plate 37 and the driving plate 36, and thus the clutch 19 is engaged. Then, torque and rotation can be transmitted between the outer rotor 3 and first drive axle 5 by the friction between the plates of the clutch 19. When the clutch cylinder 46 is not pressurized, the friction between the plates of the clutch 19 is eliminated by the action of several springs 50, mounted on pins 41 between the driving plate 36 and the pressure plate 37, and the clutch 19 is disengaged. When the brake cylinder 28 of the first brake 24 is actuated by fluid pressure, the first brake 24 will be applied, and, if the outer rotor 3 turns, the brake force will reduce the rotational speed of the outer rotor 3 and eventually will stop the rotation of the outer rotor 3. When the clutch 19 is engaged, the braking force of the first brake 24 actually brakes the rotation of the entire drive train from the outer rotor 3 to the wheels 7, 8 of the first drive axle 5. When the brake cylinder 33 of the second brake 25 is actuated by fluid pressure, the second brake 25 will be applied, and, if the inner rotor 4 turns, the brake force will reduce the rotational speed of the inner rotor 4 and eventually will stop the rotation of the inner rotor 4. Actually, the braking force of the second brake 25 brakes the rotation of the entire drive train from the inner rotor 4 to the wheels 9, 10 of the second drive axle 6.

Means operating the clutch 19, first brake 24 and second brake 25 are provided. In this embodiment of the invention, said means operating the clutch 19, first brake 24, and second brake 25 are means for fluid pressure supply and means for fluid pressure directional control. However, a fluid pressure pump 51, driven by a pump motor 52, sucks fluid from an unpressurized fluid reservoir 53, through a fluid line 54, and pressurizes fluid through a check valve 55 and fluid lines 56, 57, 58 into a fluid pressure accumulator 59. The operation of the pump motor 52 is controlled by a fluid pressure control switch, so that the fluid pressure in the accumulator 59 is maintained between predetermined high and low limits. For simplicity, the fluid pressure control switch is not shown. If a fluid pressure source, such as described above, is necessary for the steering system of the vehicle or for the service braking system of the vehicle or for both, then a common source of fluid pressure may be arranged, in an appropriate manner and by appropriate means, to supply with fluid pressure those systems and the drive system according to this invention. However, each of the said major vehicle systems—drive, steering, braking—may also have separate means for fluid pressure supply.

Said means for fluid pressure directional control are three electro-magnetically operable three-way/two-position directional control valves 60, 61, 62, which valves control the operation respectively of the clutch 19, first brake 24 and second brake 25, and a plurality of associated fluid lines. The valve 60, which controls the operation of the clutch 19, is designated hereinafter as the clutch control valve. The valve 61, which controls the operation of the first brake 24, is designated hereinafter as the first brake control valve. The valve 62, which controls the operation of the second brake 25, is designated hereinafter as the second brake control valve. When the clutch control valve 60 is not energized, as shown, the clutch cylinder 46 is connected with the reservoir 53 through fluid lines 64, 65, 66, 67 and a fluid passage provided through the not-actuated position of a fluid-pressure-modulating brake valve 63. Therefore, when the clutch control valve 60 is not energized the clutch cylinder 46 is not pressurized and the clutch 19 is disengaged. If the clutch control valve 60 is energized, it will shift positions and will connect the clutch cylinder 46 with the accumulator 59 through fluid lines 64, 68, 69, 58. Then the clutch cylinder 46 will be pressurized and the clutch 19 will be engaged. When the first brake control valve 61 is not energized, as shown, the brake cylinder 28 of the first brake 24 is connected with the reservoir 53 through fluid lines 70, 71, 66, 67 and the fluid passage provided through the not-actuated position of said fluid-pressure-modulating brake valve 63. Therefore, when the first brake control valve 61 is not energized the brake cylinder 28 is not pressurized and the first brake 24 is released. If the first brake control valve 61 is energized, it will shift positions and will connect the brake cylinder 28 of the first brake 24 with the accumulator 59 through fluid lines 70, 72, 69, 58. Then the brake cylinder 28 will be pressurized and the first brake 24 will be applied. When the second brake control valve 62 is not energized, as shown, the brake cylinder 33 of the second brake 25 is connected with the reservoir 53 through fluid lines 73, 74, 66, 67 and the passage provided through the not-actuated position of the fluid-pressure-modulating brake valve 63. Therefore, when the second brake control valve 62 is not energized the brake cylinder 33 is not pressurized and the second brake 25 is released. If the second brake control valve 62 is energized, it will shift positions and will connect the brake cylinder 33 with the accumulator 59 through fluid lines 73, 75, 58. Then the brake cylinder 33 will be pressurized and the second brake 25 will be applied. The purpose and action of said fluid-pressure-modulating brake valve 63 are described hereinafter. However, it is assumed that normally the fluid-pressure-modulating brake valve 63 is in its not-actuated position, and provides the fluid passage as described above.

The fluid-pressure-modulating brake valve 63 is provided for enabling the operator of the vehicle to brake the vehicle, in case of a failure of the primary service braking system of the vehicle, by using the braking capacity of the clutch 19 and brakes 24, 25 incorporated in the drive system. The fluid-pressure-modulating brake valve 63 is a three-way valve, of an appropriate type, controllable by the operator of the vehicle through mechanical means. When the modulating brake valve 63 is not actuated, it provides a fluid passage from the clutch cylinder 46 and brake cylinders 28, 33 of the first and second brakes 24, 25 to the reservoir 53, as it was described above. The modulated brake valve 63 is connected also with the accumulator 59 through fluid lines 76, 69, 58. The modulating brake valve 63 is arranged so that, when it is not actuated it closes the passage of fluid from the accumulator 59, and when it is placed by the operator of the vehicle in its variable actuated position it modulates fluid pressure from the accumulator 59 and directs a modulated fluid pressure through the plurality of fluid lines 66, 65, 64, 71, 70, 74, 73 into the clutch cylinder 46 and brake cylinders 28, 33 of the first and second brakes 24, 25, if the respective clutch control valve 60 and brake control valves 61, 62 are not energized, as shown. However, when some of the control valves 60, 61, 62 is energized, the fluid passage between the modulating brake valve 63 and the respective clutch or brake cylinder is closed. Therefore, whenever the modulating brake valve 63 is actuated by the operator of the vehicle it will apply modulated fluid pressure only into the clutch or brake cylinder whose respective control valve is disenergized. The modulated brake valve 63 is arranged to produce modulated fluid pressure substantially proportional to the force applied by the operator of the vehicle upon an actuating rod 77 for actuating the valve 63. For simplicity of drawing and description, the mechanical means, but the actuating rod 77, through which the operator of the vehicle actuates the modulating brake valve 63 are not shown. For the same reason, the internal arrangement of the fluid-pressure-modulating brake valve 63 is not shown, but is assumed as described above. However, fluid-pressure-modulating brake valves, such as the described valve 63, are well known.

An electronics 78 is provided for automatically selectively energizing or disenergizing the control valves 60, 61, 62. Thus, in fact, the electronics 78 automatically controls the positions of the three control valves 60, 61, 62, and consequently—the engagement of the clutch 19 and the application of the first brake 24 and second brake 25. The electronics 78 is arranged to monitor continuously, through several sensors, the rotational speeds of the input shafts 21, 23 of the first and second drive axles 5, 6, as well as, if necessary, other parameters directly related to the rotational behavior of the vehicle wheels, for example, the steering angle of the vehicle steering wheels. The sensors are not shown for simplicity of drawing and description. The electronics 78 is arranged to process the input signals from the sensors and to generate output signals for selectively energizing or disenergizing the clutch control valve 60 and the brake control valves 61, 62 in accordance with a predetermined program. Thus, ultimately, the electronics control the operation of the clutch 19, first brake 24, and second brake 25 in accordance with the rotational behavior of the drive axles 5, 6 and a predetermined program, which program is described in more details herein later. The relations between the electronics 78 and each of the control valves 60, 61, 62 are schematically represented by single lines.

The total control of the rotational behavior of the dual-rotor motor 1 is a combination of the control performed by the operator of the vehicle, through a controller 79 of the dual-rotor motor 1, and the automatic control of the clutch 19 and first and second brakes 24, 25, provided by the electronics 78 through the clutch control valve 60 and the brake control valves 61, 62. The direction of rotation and the power of the dual-rotor motor 1 are controlled by the operator of the vehicle through appropriate means related to the controller 79 of the dual-rotor motor 1. The operator of the vehicle selects the direction of rotation of the rotors 3, 4 of the dual-rotor motor 1, and thus—the direction of the vehicle motion, by a directional control switch 80, having "forward"-"neutral"-"reverse" positions. When the directional control switch 80 is in its "neutral" position the dual-rotor motor 1 cannot be energized. The operator of the vehicle energizes and controls the torque-speed performance of the dual-rotor motor 1, and thus—the tractive effort and speed of the vehicle, by a vehicle accelerator pedal 81. Signals related to the positions of the directional control switch 80 and accelerator pedal 81 are generated and transmitted to the dual-rotor motor controller 79 by appropriate means. The electronics 78 is arranged also to monitor continuously, through several sensors, the rotational speeds of the outer rotor 3 and inner rotor 4. Said sensors are not shown for simplicity of drawing and description. The electronics 78 is arranged and programmed for disenergizing the dual-rotor motor 1 when a rotational speed of either rotor higher than a respective predetermined maximum value is detected. The dual-rotor traction motor 1 and its controller 79 may be arranged also to provide electric braking of the vehicle, or vehicle speed retardation on long downhill inclines, or both. Then, it is assumed that suitable means related to the controller 79, and operated by the operator of the vehicle are provided. However, since the electric braking, with or without energy recovery, is well known in the art of the electric vehicles, and because the arrangement of the electric braking depends on the specific electrical type of the traction motor, as well as because in a drive system according to this invention it will generally employ the same means and operate in the same manner as in some of the known drive systems, it is not further discussed or claimed. The relations of the controller 79 with the directional control switch 80, accelerator pedal 81, electronics 78 and dual-rotor motor 1 are represented schematically by single lines.

In this embodiment of the invention the dual-rotor motor 1 is shown schematically as a direct-current traction motor. The electric current is conducted between electric terminals of the stationary motor enclosure 2 and the outer rotor 3 through a brush assembly 82, attached to the motor enclosure 2, and a contact-rings assembly 83 of the outer rotor 3. For simplicity, said electric terminals are not shown. The electric current is conducted between the outer rotor 3 and the inner rotor 4 through a couple of brush assemblies 84, 85 attached to the outer rotor 3, and a commutator 86 of the inner rotor 4. A motor fan 87 is mounted on the shaft 18 of the inner rotor 4 for cooling the dual-rotor motor 1. The shaft 18 of the inner rotor 4 is supported rotatably by a bearing 88 mounted in the second brake enclosure 35. However, the dual-rotor motor of the drive system according to this invention may be a direct-current motor or an alternating-current motor, and each of them may be of any particular electric type and design, appropriate for a traction motor of a vehicle. Therefore, the dual-rotor motor 1 is shown as a direct-current motor, only as one of several options for illustration of this embodiment of the invention.

The electric energy for the electric components of the drive system is supplied usually from an electric battery, through appropriate electric control and power circuits. Said battery and electric circuits are not shown for simplicity of drawing and description. If the dual-rotor motor 1 is an alternating-current traction motor, then it is assumed that a direct-current-to-alternating-current converter is incorporated between the battery and the power circuit of the dual-rotor motor controller 79. The electric power for the control circuits of the drive system is provided through a master switch of the vehicle, which switch is not shown for simplicity of drawing and description. However, it is assumed that the drive system becomes operable when the master switch is turned on.

Hereinafter the operation of the drive system according to this invention is described.

When the operator of the vehicle turns on the master switch of the vehicle the control circuits of the drive system are supplied with electric energy. If the fluid pressure in the system is below the lower limit, the pressure switch will energize the pump motor 52, and the pump 51 will start charging the accumulator 59 for supplying the system with adequate fluid pressure. In the same time, the electronics 78, detecting no rotational speed, i.e., detecting a rotational speed lower than a predetermined value, and being so programmed, will energize the clutch control valve 60, and the clutch 19 will be engaged. When the operator of the vehicle has selected the direction of motion through the directional control switch 80, and depresses the accelerator pedal 81, the controller 79 energizes the dual-rotor motor 1, and torque is transmitted from the outer rotor 3 to the wheels 7, 8 of the first drive axle 5, and from the inner rotor 4 to the wheels 9, 10 of the second drive axle 6. At this point, i.e., at the start of the vehicle, the drive system is in a low-speed/four-wheel-drive mode, and when the external forces, resisting the motion of the vehicle, are overcome by the tractive forces of the vehicle wheels 7, 8, 9, 10, the vehicle will start moving. The two rotors 3, 4, being driven to rotate in opposite directions by the same electromagnetic forces generate equal torques on their output shafts 17, 18, but may rotate with different absolute speeds if the external forces resisting the rotation of each rotor are different. Therefore, during the four-wheel-drive mode, the dual-rotor motor 1, driving the two axles 5, 6 through two mechanically independent drive trains, provides for a rotational speed differential between the axles. If the speed reduction ratio of the first and second drive axles 5, 6 are the same, and the diameters of the vehicle wheels 7, 8, 9, 10 are the same, during a straight-line motion of the vehicle the outer rotor 3 and the inner rotor 4 will rotate in opposite directions with substantially the same absolute speed, equal to a half of the relative rotational speed between both rotors 3, 4. However, there is no requirement for such equality between the reduction ratios or the wheels diameters of both drive axles for proper performance of the drive system according to this invention. If the dual-rotor motor 1 has the adequate power, and the operator of the vehicle continues to depress the accelerator pedal 81, the vehicle will continue to accelerate, generating tractive forces throughout all four wheels 7, 8, 9, 10, until the electronics 78 detects a rotational speed higher than a predetermined value. At that point, the electronics 78, being so programmed, will disenergize the clutch control valve 60 and will energize the first brake control valve 61, therefore, the clutch 19 will be disengaged and the first brake 24 will be applied. Thus, the power transmission between the outer rotor 3 and the wheels 7, 8 of the first drive axle 5 will be interrupted and the rotation of the outer rotor 3 will decelerate and stop. At that point the wheels 7, 8 of the first drive axle 5 will continue to roll, producing no tractive force, while in the same time transmission of power between the inner rotor 4 and the wheels 9, 10 of the second drive axle 6 will continue. Now the drive system will operate in a high-speed/two-wheel-drive mode. If the dual-rotor motor 1 is capable to provide adequate power, and the operator continues to depress the accelerator pedal 81, the drive system, being in high-speed/two-wheel-drive mode, will continue to accelerate the vehicle until an appropriate speed is achieved. When the drive system operates in high-speed/two-wheel-drive mode and the vehicle decelerates, the electronics 78, being so programmed, will disenergize the first brake control valve 61 and will energize the clutch control valve 60 when a rotational speed lower then a predetermined value is detected. Then, the first brake 24 will be released and the clutch 19 will be engaged, therefore, the power transmission between the outer rotor 3 and the wheels 7, 8 of the first drive axle 5 will be restored, and the drive system will return into low-speed/four-wheel-drive mode. Whether only the rotational speed of the first drive axle 5, or only the rotational speed of the second drive axle 6, or the sum of both rotational speeds will govern the change of the drive mode depends on the particular arrangement of the electronics 78, which arrangement is a choice of the vehicle designer. However, for a stable change of drive-mode, the predetermined speed value of change from low-speed/four-wheel-drive to high-speed/two-wheel-drive is programmed a little higher than the predetermined speed value of change from high-speed/two-wheel-drive to low-speed/four-wheel-drive. Anyway, the difference between these two speed values is insignificant. In fact, the two predetermined speed values of drive-mode change, programmed in the electronics 78, relate directly to specific relative rotational speeds between the rotors 3, 4, of the dual-rotor motor 1, and therefore—to specific speeds of the vehicle. These speeds are selected by the designer of the vehicle in accordance with the particular current-torque-speed characteristic of the dual-rotor motor 1, required vehicle dynamics, and other design considerations.

The described earlier means for fluid pressure supply, clutch control valve 60, first brake control valve 61, and the plurality of associated fluid lines, along with the electronics 78 are altogether the means for drive mode control of the system.

One of the major advantages of the drive system according to this invention relates to the fact, that the total torque available on the shafts of both rotors 3, 4 of the dual-rotor motor 1 is two times bigger than the torque available on the rotor shaft of an otherwise equivalent conventional traction motor. Consequently, when the drive system according to this invention is in low-speed/four-wheel-drive mode it requires a substantially two times smaller speed reduction ratio between each rotor of the dual-rotor motor 1 and the respective vehicle wheels, in comparison with the speed reduction ratio which would be required between the rotor of an otherwise equivalent conventional motor and the vehicle wheels, for generating the same tractive effort. Hence, having two times smaller reduction ratio between each rotor and the respective drive wheels, the system according to this invention, when in high-speed/two-wheel-drive mode, is capable to develop two times higher maximum vehicle speed than the speed which could be developed by a drive system utilizing an otherwise equivalent conventional motor and a rigid drive train. This is true, as far as the limitation of the vehicle speed imposed by the limitation of the rotational speed of the inner rotor 4 is concerned, and at the condition that the maximum rotational speed of the inner rotor 4 of the dual-rotor motor 1 is the same as the maximum rotational speed of the rotor of the equivalent conventional motor. In fact, when the drive system is in high-speed/two-wheel-drive mode, and the outer rotor 3 is immobilized, the dual-rotor motor 1 performs as a conventional traction motor. However, it is well known that the ultimate limitation of the vehicle speed is imposed by the available power of the traction motor. Nevertheless, in principal, the drive system according to this invention provides for a significantly higher maximum vehicle speed, than the speed provided by the known drive systems for electric vehicles, and this is one of the major advantages of this invention.

The electronics 78 is arranged to monitor and compare continuously the rotational speeds of the two drive axles 5, 6. When the drive system is in low-speed/four-wheel-drive mode, the electronics 78 may detect a significant traction slip of the wheels 7, 8 of the first drive axle 5, or a significant traction slip of the wheels 9, 10 of the second drive axle 6. Such a traction slip is demonstrated by a sudden acceleration of the rotation of the input shaft of the drive axle with poor traction in reference to the rotation of the input shaft of the drive axle with better traction. However, if a traction slip of the first drive axle 5 higher than a predetermined value is detected, the electronics 78, being so programmed, will energize the first brake control valve 61, and thus will apply the first brake 24. Then the braking torque produced by the first brake 24 will reduce the rotational speed of the spinning wheels 7, 8 of the first drive axle 5. By the same manner, if a traction slip of the second drive axle 6 higher than a predetermined value is detected, the electronics 78, being so programmed, will energize the second brake control valve 62, and thus will apply the second brake 25. Then the braking torque produced by the second brake 25 will reduce the rotational speed of the spinning wheels 9, 10 of the second drive axle 6. When one of the two brakes is applied, the torque transmitted to the axle having better traction will increase with the value of the applied braking torque, and eventually the four-wheel traction will be restored. When the drive system is in high-speed/two-wheel-drive mode, only the wheels 9, 10 of the second drive axle 6 can experience traction slip. In such a case, the electronics 78 will apply the second brake 25, and the braking torque of the second brake 25 will reduce the rotational speed of the spinning wheels 9, 10 of the second drive axle 6 until the traction is restored. Once the difference between the rotational speeds of the input shafts 21, 23 of the first and second drive axles 5, 6 is reduced below a predetermined value, i.e., once the traction is restored, the electronics 78, being so programmed, will disenergize the respective brake control valve, and thus will discontinue the automatic braking action of the brake, which has been applied automatically for reducing the traction slip.

The described earlier means for fluid pressure supply, first brake control valve 61, second brake control valve 62, and the plurality of associated fluid lines, along with the electronics 78 are altogether the means for anti-slip traction control of the system.

In case of failure of the vehicle service braking system, the operator of the vehicle may apply a force upon the actuating rod 77, and thus may actuate the modulating brake valve 63. If at that moment the drive system is in low-speed/four-wheel-drive mode, the clutch control valve 60 is energized, the clutch cylinder 46 is connected with the accumulator 59, the clutch 19 is engaged, and the fluid passage from the clutch cylinder 46 to the modulating brake valve 63 is closed. In the same time, the first and second brake control valves 61, 62 are disenergized and the brake cylinders 28, 33 of the two brakes 24, 25 are connected with the modulating brake valve 63. Therefore, in case of low-speed/four-wheel-drive mode, the modulated fluid pressure from the modulating brake valve 63 will be directed into the brake cylinders 28, 33 of the two brakes 24, 25. Thus, the two brakes 24, 25 will be applied simultaneously, and braking torque will be transmitted from the first brake 24 to the wheels 7, 8 of the first drive axle 5, and from the second brake 25 to the wheels 9, 10 of the second drive axle 6. If the drive system is in high-speed/two-wheel-drive mode when the fluid-pressure-modulating brake valve 63 is actuated, then the clutch control valve 60 is disenergized, the clutch 19 is disengaged, and the clutch cylinder 46 is connected with the modulating brake valve 63, while the first brake control valve 61 is energized, the brake cylinder 28 of the first brake 24 is connected with the accumulator 59, the first brake 24 is applied, and the fluid passage from the cylinder 28 of the first brake 24 to the modulating brake valve 63 is closed. In the same time, the second brake control valve 62 is disenergized and the brake cylinder 33 of the second brake 25 is connected with the modulating brake valve 63. Therefore, in case of high-speed/two-wheel-drive mode, the modulated fluid pressure from the modulating brake valve 63 will be directed into the clutch cylinder 45 and the second brake cylinder 33. Thus, the clutch 19 will be engaged and the second brake 25 will be applied simultaneously. Then the clutch 19 will work as a brake, and braking torque from the clutch 19 will be transmitted to the wheels 7, 8 of the first drive axle 5, while the braking torque from the second brake 25 will be transmitted to the wheels 9, 10 of the second drive axle 6. When, under the braking action of the clutch 19 and second brake 25, the vehicle speed is reduced and the drive system is placed by the means for drive mode control into low-speed/four-wheel-drive mode, the clutch control valve 60 and the first brake control valve 61 will shift their positions, and the modulated fluid pressure from the modulating brake valve 63 will now apply the first brake 24 instead of engaging the clutch 19. Since the second brake 25 continues to be applied, and the clutch is now engaged by the means for drive mode control, braking torque will continue to be transmitted to all vehicle wheels, as long as the operator applies a force upon the actuating rod 77 of the modulating brake valve 63. Thus, the operator of the vehicle may reduce the speed and stop the vehicle, using the braking capacity of the clutch 19 and brakes 24, 25 of the drive system.

If, because of failure in the drive system, the outer rotor 3 remains without external torque load, it will accelerate until the electronics 78 detects a specified maximum speed of the outer rotor 3. At that point, the electronics 78, being so programmed, will generate and transmit a signal to the controller 79 for disenergizing the dual-rotor motor 1. If, because of failure in the drive system, the inner rotor 4 remains without external torque load, it will accelerate until the electronics 78 detects a specified maximum speed of the inner rotor 4. At that point, the electronics 78, being so programmed, will generate and transmit a signal to the controller 79 for disenergizing the dual-rotor motor 1. Thus, the electronics 78 will protect the rotors 3, 4 of the traction motor 1 from destruction due to over-speeding.

From the above description of this invention it is obvious for the skilled in the art that the individual components of the drive system may be of different suitable specific types. For example, multi-disc wet clutch and brakes may by incorporated in the system, instead of the described single-frictional-plate dry clutch and brakes. Instead of the described clutch and brakes operated by fluid-pressure, electromagnetic clutch and brakes may be utilized, and, accordingly, appropriate means for electrical operation of the clutch and brakes, controllable by the electronics, may be used, etc.

It is also obvious that some modifications and simplifications of the drive system according to this invention may be made. For example, the system may not have means controlled by the operator for braking the vehicle, if a secondary braking system is not required or desirable. In such a case, the fluid-pressure-modulating brake valve and the associated fluid lines, as well as means for actuating this valve, will not be included in the system. Another modification of the system may not have means for anti-slip traction control. Then, the second brake control valve, and the associated fluid lines may not be included, and the electronics may not be arranged and programmed to selectively apply the first or the second brake in case of traction slip. Another modification of the system may have means for manual control of the drive mode, instead of the described above clutch control valve, first brake control valve, and the electronics which provides for automatic control of these two valves, and thus—for automatic change of the drive mode. And in another modification the system may not have the clutch, but instead may have the shaft of the outer rotor directly connected with the input shaft of the first drive axle. Such a simplified system will have only four-wheel-drive mode, but nevertheless, it may have the two brakes, and may provide anti-slip traction control and braking of the vehicle, generally by the same means and manner as in the drive system described herein above in detail.

However, all such replacements, modifications and simplifications will be just other embodiments of the drive system according to this invention.

What is claimed is:

1. A drive system for vehicles comprising:
    a dual-rotor electric traction motor having a first rotor and a second rotor, wherein when said dual-rotor motor is energized said two rotors are propelled by the same electromagnetic forces to rotate in opposite directions;
    a first drive axle having two wheels and a second drive axle having two wheels, wherein the wheels of at least one of said two drive axles are steerable;
    a first drive train connecting said first rotor to said first drive axle for transmitting mechanical energy between the first rotor and the wheels of the first drive axle, and
    a second drive train connecting said second rotor to said second drive axle for transmitting mechanical energy between the second rotor and the wheels of the second drive axle,
    whereby providing a four-wheel-drive mode.

2. A drive system according to claim 1, wherein the first rotor is an outer rotor and the second rotor is an inner rotor.

3. A drive system according to claim 1, wherein said first drive train including a clutch for interrupting the transmission of mechanical energy between the first rotor and the first drive axle, and further comprising:
    a first brake for braking the rotation of the first rotor when said clutch is disengaged or braking the rotation of said first drive train when the clutch is engaged, and
    a drive mode controller for selectively engaging said clutch and releasing the first brake or disengaging the clutch and applying the first brake,
    whereby providing selectively a low-speed/four-wheel-drive mode or a high-speed/two-wheel-drive mode.

4. A drive system according to claim 3, wherein said first drive train including a drive shaft between the clutch and the first drive axle.

5. A drive system according to claim 3, wherein said drive mode controller comprising electrically controllable means operating the clutch, electrically controllable means operating the first brake, and an electronics arranged and programmed to monitor continuously the rotational speed of at least one of the two drive axles and to control said means operating the clutch and said means operating the first brake for engaging the clutch and releasing the first brake when a rotational speed lower than a predetermined value is detected or disengaging the clutch and applying the first brake when a rotational speed higher than a predetermined value is detected, whereby providing an automatic control of the speed range and drive mode.

6. A drive system according to claim 5, wherein said clutch having at least a clutch cylinder operable by fluid pressure for engaging the clutch when pressurized, and the first brake having at least one brake cylinder operable by fluid pressure for applying the first brake when pressurized, and wherein said means operating the clutch and said means operating the first brake are means for fluid pressure supply, and means for fluid pressure directional control controlled by said electronics.

7. A drive system according to claim 6, wherein said means for fluid pressure supply include a pump driven by a pump motor, a fluid reservoir, a fluid pressure accumulator charged by said pump through a check valve, a fluid pressure switch controlling said pump motor for maintaining the fluid pressure in predetermined limits, and a plurality of connecting fluid lines, and wherein said means for fluid pressure directional control include:
    an electromagnetically operable three-way/two-position directional control valve, designated as a clutch control valve, and a plurality of fluid lines for connecting said clutch cylinder with said fluid reservoir when said clutch control valve is disenergized or connecting the clutch cylinder with said fluid pressure accumulator when the clutch control valve is energized by the electronics, and
    an electromagnetically operable three-way/two-position directional control valve, designated as a first brake control valve, and a plurality of fluid lines for connecting said brake cylinder of said first brake to the fluid reservoir when said first brake control valve is disenergized or connecting the brake cylinder of the first brake with the fluid pressure accumulator when the first brake control valve is energized by the electronics.

8. A drive system according to claim 3, and further comprising a second brake for braking the rotation of the second drive train, and an anti-slip traction controller for selectively applying said first brake when a traction slip of the first drive axle is detected or said second brake when a traction slip of the second drive axle is detected, whereby providing an anti-slip traction control.

9. A drive system according to claim 8, wherein said anti-slip traction controller comprising electrically controllable means operating the first brake, electrically controllable means operating the second brake, and an electronics arranged and programmed to monitor and compare continuously the rotational speeds of the first and second drive axles and to control said means operating the first brake and said means operating the second brake for applying the first brake when a traction slip of the first drive axle higher than a predetermined value is detected or applying the second brake when a traction slip of the second drive axle higher than a predetermined value is detected, whereby providing an automatic anti-slip traction control.

10. A drive system according to claim 9, wherein the first brake having at least one brake cylinder operable by fluid pressure for applying the first brake when pressurized, and the second brake having at least one brake cylinder operable by fluid pressure for applying the second brake when pressurized, and wherein the means operating the first brake and the means operating the second brake are means for fluid pressure supply, and means for fluid pressure directional control controlled by said electronics.

11. A drive system according to claim 10, wherein said means for fluid pressure supply include a pump driven by a pump motor, a fluid reservoir, a fluid pressure accumulator charged by said pump through a check valve, a fluid pressure switch controlling said pump motor for maintaining the fluid pressure in predetermined limits, and a plurality of connecting fluid lines, and wherein said means for fluid pressure directional control include:
    an electromagnetically operable three-way/two-position directional control valve, designated as a first brake control valve, and a plurality of fluid lines for connecting said brake cylinder of the first brake with said fluid reservoir when said first brake control valve is disenergized or connecting the cylinder of the first brake with said fluid pressure accumulator when the first brake control valve is energized by the electronics, and an electromagnetically operable three-way/two-position directional control valve, designated as a second brake control valve, and a plurality of fluid lines for connecting said brake cylinder of the second brake to the fluid reservoir when said second brake control valve is disenergized or connecting the brake cylinder of the second brake with the fluid pressure accumulator when the second brake control valve is energized by the electronics.

12. A drive system according to claim 8, and further comprising a brake actuator controllable by the operator of the vehicle for applying the first brake and the second brake simultaneously when the clutch is engaged and the first brake is released by the drive mode controller or engaging the clutch and applying the second brake simultaneously when the clutch is disengaged and the first brake is applied by the drive mode controller, whereby braking simultaneously the first and second drive trains.

13. A drive system according to claim 12, wherein the clutch having at least one clutch cylinder for engaging the clutch when pressurized, the first brake having at least one brake cylinder for applying the first brake when pressurized, and the second brake having at least one brake cylinder for applying the second brake when pressurized, and wherein said brake actuator controllable by the operator of the vehicle comprising means for fluid pressure supply, and means for fluid pressure modulation and directional control controlled by the operator of the vehicle.

14. A drive system according to claim 13, wherein said means for fluid pressure supply include a pump driven by a pump motor, a fluid reservoir, a fluid pressure accumulator charged by said pump through a check valve, a fluid pressure switch controlling said pump motor for maintaining the fluid pressure in predetermined limits, and a plurality of connecting fluid lines, and wherein said means for fluid pressure modulation and directional control include a three-way fluid-pressure-modulating brake valve and a plurality of fluid lines for providing fluid passage from the clutch cylinder and from the brake cylinders of the first and second brakes to said fluid reservoir, when said fluid-pressure-modulating brake valve is not actuated, or modulating fluid pressure from said accumulator and directing a modulated fluid pressure into the clutch cylinder and brake cylinders of the first and second brakes, when the fluid-pressure-modulating brake valve is actuated by the operator of the vehicle, said modulated fluid pressure being substantially proportional to the force applied by the operator of the vehicle for actuating the fluid-pressure-modulating brake valve.

15. A drive system according to claim 1, wherein said second drive train including a drive shaft between the second rotor and the second drive axle.

16. A drive system according to claim 1, and further comprising an electronics arranged and programmed to monitor continuously the rotational speeds of the first and second rotors for disenergizing the dual-rotor motor when a rotational speed of either rotor higher than a respective predetermined maximum value is detected.

17. A method for driving a vehicle comprising a first drive axle having two wheels and a second drive axle having two wheels, wherein the wheels of at least one of said two drive axles are steerable, said method comprising the steps of:

generating mechanical energy within a dual-rotor electric traction motor having a first rotor and a second rotor, wherein when said dual-rotor motor is energized said two rotors are propelled by the same electro-magnetic forces to rotate in opposite directions;

transmitting mechanical energy from said first rotor to said first drive axle through a first drive train, and transmitting mechanical energy from said second rotor to said second drive axle through a second drive train, whereby providing a low-speed/four-wheel-drive mode.

18. A method for driving a vehicle according to claim 17, and further comprising the steps of:

interrupting the transmission of mechanical energy between the first rotor and the first drive axle through a clutch included in said first drive train and operable by a drive mode controller, and braking the rotation of the first rotor through a first brake operable by said drive mode controller, whereby further providing a high-speed/two-wheel-drive mode.

19. A method for driving a vehicle according to claim 18, and further comprising the steps of:

monitoring and comparing continuously the rotational speeds of the first and second drive axles through an anti-slip traction controller;

braking the rotation of the first drive train through said first brake operable by said anti-slip traction controller, when a traction slip of the first drive axle is detected, or braking the rotation of said second drive train through a second brake operable by the anti-slip traction controller, when a traction slip of the second drive axle is detected, whereby further providing an anti-slip traction control.

20. A method for driving a vehicle according to claim 19, and further comprising the following steps for braking the vehicle:

braking simultaneously the rotation of the first and second drive trains by applying the first brake and said second brake through a brake actuator operable by the operator of the vehicle, when the clutch is engaged and the first brake is released by the drive mode controller, and braking simultaneously the rotation of the first and second drive trains by engaging the clutch and applying the second brake through said brake actuator, when the clutch is disengaged and the first brake is applied by the drive mode controller.

21. A method for manufacturing a vehicle comprising the steps of:

providing a dual-rotor electric traction motor having a first rotor and a second rotor, wherein when said dual-rotor-motor is energized said two rotors are propelled by the same electromagnetic forces to rotate in opposite directions;

providing a first drive axle having two wheels and a second drive axle having two wheels, wherein the wheels of at least one of said two drive axles are steerable;

connecting said first rotor to said first drive axle through a first drive train for transmitting mechanical energy between the first rotor and the wheels of the first drive axle, and connecting said second rotor to said second drive axle through a second drive train for transmitting mechanical energy between the second rotor and the wheels of the second drive axle.

22. A method for manufacturing a vehicle according to claim 21, wherein said first drive train includes a clutch for interrupting the transmission of mechanical energy between the first rotor and the first drive axle, and further comprising the steps of:

providing a first brake for braking the rotation of the first rotor, and providing a drive mode controller arranged to operate said clutch and said first brake for selectively engaging the clutch and releasing the first brake or disengaging the clutch and applying the first brake.

23. A method for manufacturing a vehicle according to claim 22, and further comprising the steps of:

providing a second brake for braking the rotation of said second drive train, and providing an anti-slip traction controller arranged and programmed to monitor and compare continuously the rotational speeds of the first and second drive axles and to operate the first brake and said second brake for applying the first brake when a traction slip of the first drive axle is detected or applying the second brake when a traction slip of the second drive axle is detected.

24. A method for manufacturing a vehicle according to claim 23, and further comprising the step of providing a brake actuator operable by the operator of the vehicle for braking the rotation of said first and second drive trains simultaneously by applying the first and second brakes when the clutch is engaged by said drive mode controller or by engaging the clutch and applying the second brake when the clutch is disengaged and the first brake is applied by the drive mode controller.

* * * * *